United States Patent Office 3,211,375
Patented Oct. 12, 1965

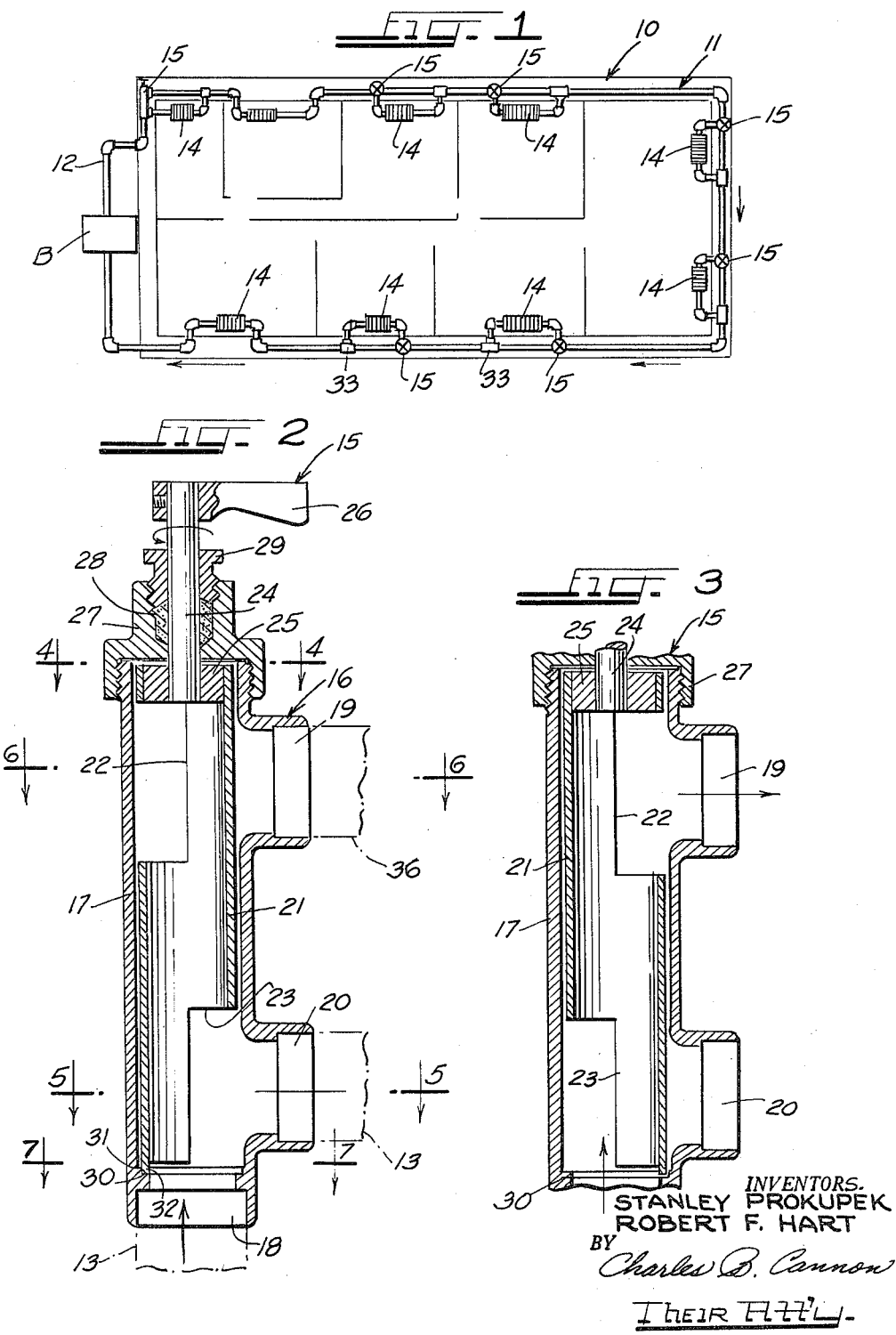

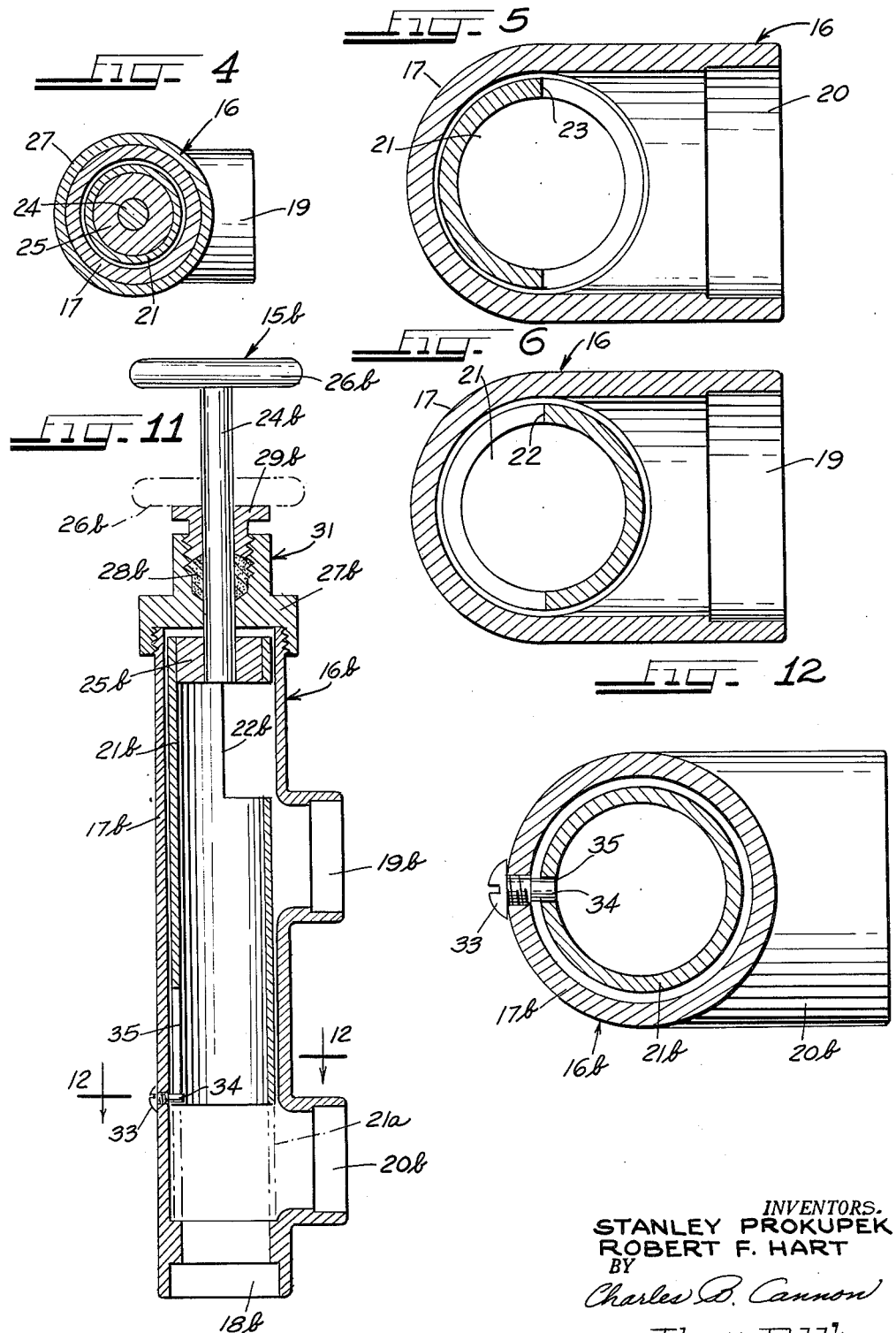

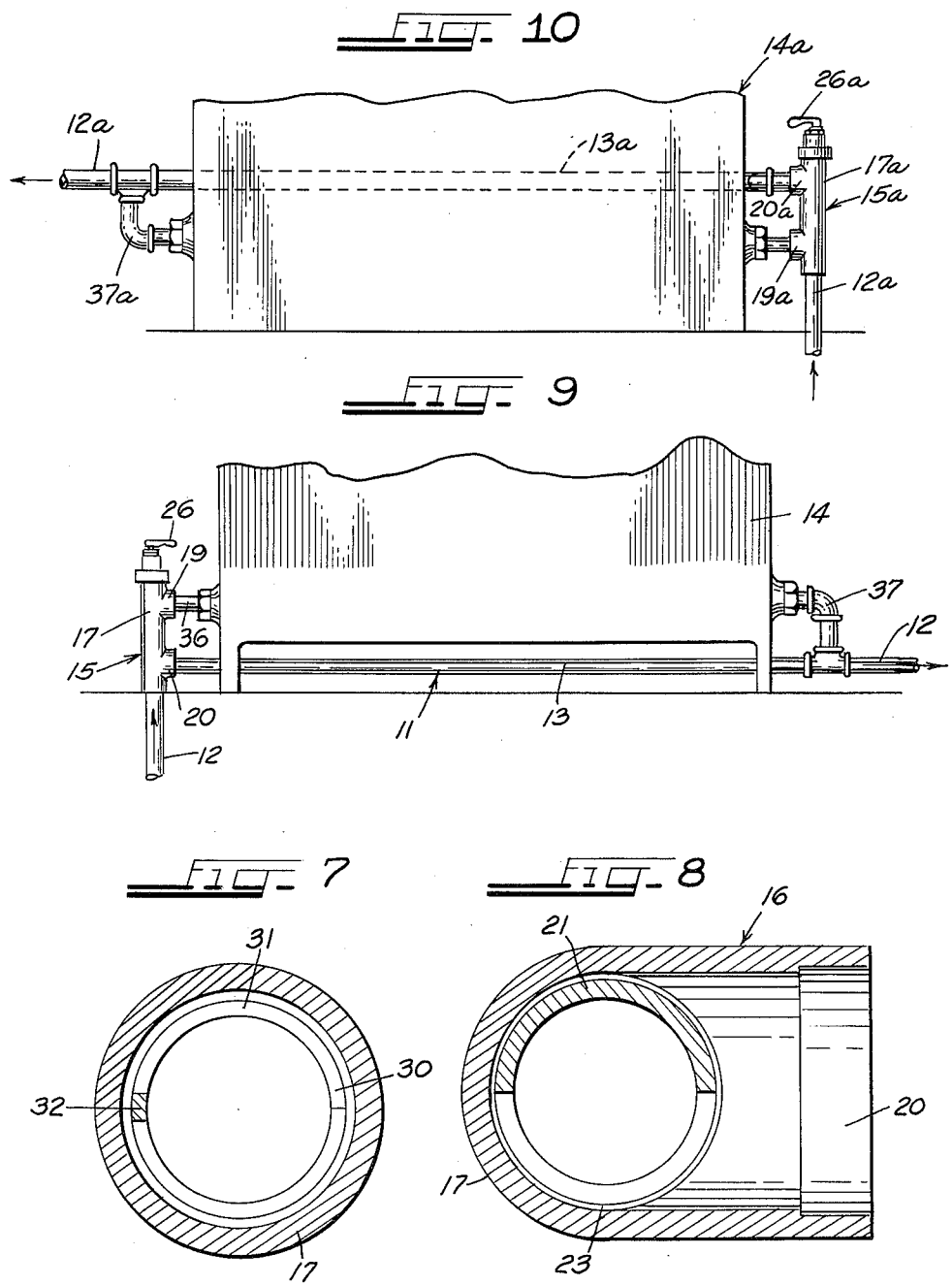

3,211,375
HEATING AND COOLING SYSTEM AND
VALVE MEANS THEREFOR
Stanley Prokupek, 4319 Western Ave., Western Springs, Ill., and Robert F. Hart, 4505 Highland Ave., Downers Grove, Ill.
Filed Sept. 11, 1961, Ser. No. 137,221
1 Claim. (Cl. 237—59)

This invention relates to a single pipe heating and cooling system and valve means therefor.

An object of the invention is to provide a new and improved single pipe heating and cooling system and valve means therefor which may be used in connection with fluid heating systems, such as hot water heating systems, and cooling systems, for controlling the flow of heating or cooling fluid through the system and through radiators or like heat-exchangers embodied therein, in such a manner that all of the heating or cooling fluid in the single pipe line may be directed through all of the radiators or like heat-exchangers in the system or none or only a part of the heating or cooling fluid in the system may be passed through a selected radiator or radiators, or like heat-exchangers, and the balance of the heating fluid by-passed around one or more radiators, or heat-exchangers, as desired, without altering the operation or efficiency of the system, as such.

Another object of the invention is to provide a new and improved heating and cooling system which may be used in conjunction with different types of heating and cooling systems and with radiators or like heat-exchangers in a room to provide adequate temperature control in each radiator or like heat-exchanger unit independently of the other radiators or heat-exchanger units in the system.

Another object of the invention is to provide a new and improved valve unit for use in the new heating and cooling system and for carrying out the functions and purposes thereof.

A further object of the invention is to provide a new and improved heating and cooling system in which full temperature control is provided for each radiator or like heat-exchanger in the system independently of all other radiators or heat-exchangers in the system and without affecting or impeding the full and free flow of the heating or cooling fluid in the system.

Another object of the invention is to provide a new and improved hot water heating system in which a part or all of the hot water in the single pipe flow line may be by-passed around a selected radiator or radiators without interfering with or detracting from the heating efficiency of the system beyond such selected radiator or radiators.

Other and further objects of the present invention will be apparent from the following description and claims and are illustrated in the accompanying drawings, which by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

FIG. 1 is a schematic plan view of a typical heating or cooling system embodying the present invention;

FIG. 2 is an enlarged central vertical sectional view of a typical form of the new valve unit embodied in the invention and showing the movable parts thereof in a preselected position;

FIG. 3 is a fragmentary central vertical sectional view of the valve unit shown in FIG. 2 but showing the movable parts of the valve unit in a different position from that in which they are shown in FIG. 2;

FIG. 4 is a horizontal sectional plan view on line 4—4 in FIG. 2;

FIG. 5 is a horizontal sectional plan view on line 5—5 in FIG. 2;

FIG. 6 is a horizontal sectional view on line 6—6 in FIG. 2;

FIG. 7 is a sectional plan view on line 7—7 in FIG. 2;

FIG. 8 is a view similar to FIG. 5 but showing the movable parts of the valve unit turned 90° from the position in which they are shown in FIG. 5;

FIG. 9 is a fragmentary elevational view showing a typical form of a radiator or like exchanger unit embodied in the new heating and cooling system having one embodiment of the novel arrangement of valve unit and by-pass unit associated therewith;

FIG. 10 is a fragmentary elevational view of a modification of the invention as shown in FIG. 9;

FIG. 11 is a central vertical sectional view showing a modified form of the new valve unit which may be employed in the practice of the present invention; and FIG. 12 is a horizontal sectional plan view on line 12—12 in FIG. 11.

A preferred embodiment of a heating or cooling system embodying the present invention is schematically illustrated in FIG. 1 of the drawings, where it is generally indicated at 10, and is shown as embodying a fluid circulatory system 11 such as a hot water heating system, or the like, which includes a source of hot water in the form of a hot water boiler "B," and a single pipe flow line 12 associated therewith, and in which any desired number of heat-transfer or heat-exchanger units, such as radiators 14, of any suitable design and construction may be arranged at suitable intervals therein. In the practice of the present invention, the flow line pipe or tubing 12 may be of any suitable diameter such, for example, as ¾".

A flow control valve unit 15 may be associated with each of the radiators or like heat-exchangers 14 for the purpose of controlling the flow of hot water or like heating or cooling fluid through the radiator 14 or by-passing all or a part of the flow around one or more radiators 14, as desired, through a by-pass line 13 which is associated with each radiator 14. In the practice of the present invention the diameter of each of the by-pass lines 13 is the same as that of the main single pipe flow line 12 and, in the example given above, is ¾", although the diameter of the flow line pipe 12 and by-pass lines 13 may be varied to suit different heating and cooling systems as long as the diameter of the single pipe flow line 12 and by-pass lines 13 is kept the same.

A typical embodiment of the new flow control valve unit is illustrated in FIGS. 2 to 9, inclusive, of the drawings, wherein it is generaly indicated at 15, and includes a valve body 16 comprising a generally cylindrical housing 17 having an inlet opening 18 at its lower end and which is adapted to be connected into the single pipe flow line 12 at the inlet side from the boiler 12 and adjacent the inlet side of one of the radiators 14. As shown in FIGS. 2 and 9, the valve housing 17 has an upper radiator outlet opening 19 and a lower by-pass outlet opening 20 formed therein. The upper hot water outlet opening 19 is adapted to be connected by a suitable connection 36 to the radiator 14 (FIG. 9) and the lower end by-pass outlet opening 20 is connected directly into the by-pass line 13 (FIG. 9).

A movable and generally tubular or cylindrical valve member 21 is movably mounted in the valve housing 17 and is provided with an upper outlet port 22 and a lower outlet port 23 which are adapted to be selectively disposed in or out of registry with the upper and lower outlet openings 19 and 20, respectively.

The movable valve member 21 has a member 25 secured thereto in the upper end portion thereof, and a handle stem 24 is attached to the member 25 and projects upwardly out of the valve housing 17. The valve stem 24 has a handle 26 attached to the upper portion thereof. The handle stem 24 projects through a central opening in a closure cap 27, which is attached to the valve housing 17, and a suitable lubricating packing 28 is arranged in the valve cap 27 and is retained therein by a closure plug 29 which is threaded into a central threaded opening in the valve cap 27 (FIG. 2).

In the use of the invention as a hot water heating system 10, one of the new valve units 15 may be arranged in the inlet side of the single pipe flow line 12 in association with each of the radiators 14, as shown in FIGS. 1 and 9, and when it is desired to control the amount of the flow of water from the hot water boiler or source 12 to each radiator 14 this may be accomplished by manipulating the handle 26 on the valve stem 24 of one or more selected valve units 15 so as to position the ports 22 and 23 in the movable valve body 21 in a selected position with respect to the upper and lower outlet openings 19 and 20, respectively, in the valve housing 17. Thus, for example, with the parts arranged as in FIG. 2, hot water will flow from the single pipe flow line 12 into the valve housing 17 by way of the inlet opening 18 and will flow entirely out of the lower and by-pass outlet opening 20 back into the by-pass line 13 for the reason that in the position of the movable valve member 21, as shown in FIG. 2, the upper port 22 therein is disposed completely out of registry with the upper or radiator outlet opening 19, which is then completely closed. Hence, the hot water thus by-passed around a selected radiator 14 will be returned through the by-pass line 13 to the flow line 12 for passage through all or any one or more of the other radiators 14 to the flow line 12, beyond the selected radiator 14, as desired.

However, if it is desired to pass all of the hot water from the flow line 12 through a selected radiator 14, this may be accomplished by manipulating the movable valve member 21, by its handle 26 and the valve handle stem 24, to position the parts in the position in which they are shown in FIG. 3 and in which the upper port 22 is disposed in registry with the radiator outlet opening 19 in the valve housing 17 and the lower port 23 in the movable valve member 21 is disposed in a position to close completely the by-pass outlet opening 20. Hot water will thereupon enter the valve housing 17 through the inlet opening 18 from the single pipe flow line 12, and will flow up through the movable valve member 21 out of the port 22 through the connection 36 to the radiator 14 and thence through the latter and the connection 37 (FIG. 9) back into the flow line 12.

A stop member 32 is provided on the bottom edge portion of the movable valve member 21 and extends downwardly therefrom and engages a shoulder 31 which is formed on an annular flange 30 of the valve housing 17.

Limiting positions of the movable valve member 21, as in FIG. 2, may be controlled by the engagement of the stop member 32 with the shoulder 31 so as to position the radiator outlet port 23 in registry with the by-pass outlet opening 20 and so as to position the port 22 in closed position relative to the radiator outlet opening 19, as shown in FIG. 2.

In FIG. 8 the movable valve member 21 is shown in a position in which it has been turned clockwise 90° from the position in which the parts are shown in FIGS. 2 and 5, thereby disposing the by-pass outlet port 23 in the movable valve member 21 in partial registry with the by-pass outlet opening 20 in the valve housing 17 and disposing the radiator outlet port 22 in the movable valve member 21 in partial registry with the radiator outlet opening 19 in the valve housing 17, as shown in FIG. 8.

In this position of the parts, as in FIG. 8, water from the flow line 12 will flow into the inlet opening 18 in the valve housing 17 and thence through the movable valve member 21 and partly out of the by-pass outlet port 21 to the flow line 12 while, at the same time, a part of the hot water will flow through the movable valve member 21 and out of the radiator outlet port 22 to the connection 36 and thence into the radiator 14, and from the latter back to the flow line 12. In this manner a part of the entire volume of hot water in the flow line 12 is allowed to flow through the valve unit 15 to the radiator 14 while, at the same time, a part of the volume of hot water in the flow line 12 will be by-passed around a selected radiator 14 back into the flow line 12.

A modification of the invention is illustrated in FIG. 10 of the drawings, and those parts thereof which are similar to or comparable to parts shown in FIGS. 2 to 9, inclusive, have been given similar reference numerals followed by the additional and distinguishing reference character "a."

In the form of the invention shown in FIG. 10 the arrangement of the radiator and by-pass outlets of the valve housing 17a has been reversed, relative to the positions in which these parts are shown in the form of the invention illustrated in FIGS. 2 to 9, inclusive, that is to say, the radiator outlet opening 19a is disposed in the lower portion of the valve housing 17a and the by-pass outlet opening 20a is disposed in the upper portion of the valve housing 15a, and the direction of fluid flow shown is the reverse of that in the form of the invention illustrated in FIGS. 2 to 9, inclusive, and is counterclockwise as distinguished from the clockwise flow in the form of the invention illustrated in FIGS. 2 to 9, inclusive.

A modified form of the new valve unit for the new single pipe heating system is illustrated in FIGS. 11 and 12 of the drawings and in this form of the new valve embodied in the invention, those parts thereof which are similar to or comparable to parts in the form of the valve shown in FIGS. 2 to 9, inclusive, have been given similar reference numerals followed by the additional and distinguishing reference character "b."

In the form of valve shown in FIGS. 11 and 12 only a single outlet port 22b is provided in the movable valve member 21b and it is arranged in the upper end portion thereof (FIG. 11).

In the form of the new valve unit shown in FIGS. 11 and 12, a slot 35 is provided in the body of the movable valve member 21a and a stop member 35 is mounted in the wall of the valve housing 17a and has a portion 34 which extends into and works in the slot 35.

In the use of the valve unit shown in FIGS. 11 and 12 the generally tubular or cylindrical movable valve member 21b may be manipulated, by the handle 26b and valve stem 24b, and attached member 25b, so as to position the movable valve member 21b in the position in which it is shown in FIG. 10 and in which position the lower end portion of the body of the movable member 21b is disposed above the by-pass outlet 20b so that water entering the valve housing 17b from the flow line 12 will pass into the valve housing 17b by way of the inlet 18b and thence out of the by-pass outlet 20b into the by-pass line and back to the flow line 12. However, in this position of the parts, as in FIG. 10, the movable valve member 21b closes the upper radiator outlet 19b so that all of the water entering the valve housing 17b will flow from the inlet opening 18b through the valve housing 17b and out of the by-pass outlet opening 20b and none of the water entering the valve housing 17b will flow out of the radiator outlet 19a.

However, the movable valve member 21b may be manipulated or depressed by the handle 26b of the valve stem 24b to position the port 22b partially or fully in registry with the radiator outlet 19b of the valve housing 17b so as to partially open the radiator outlet 19b and so as to partially close the by-pass outlet 20b, so that a part of the hot water entering the valve housing 17b may be directed out of the radiator outlet opening 19b to the radiator 14 and a part of the water in the flow line 12 may be directed through the by-pass outlet 20b into the by-pass line and thence back into the flow line 12 without going through the radiator 14, or as desired, the movable valve member 21b may be positioned to entirely close the by-pass outlet opening 20b and thus direct all of the hot water entering the valve housing 17b through the radiator outlet 19b to the radiator 14.

In the use of the valve unit shown in FIGS. 10 and 11, the portion 34 of the stop member 35, working in the slot 35, will guide the movable valve member 21b in the valve housing 17b and will limit the downward movement thereof when the wall which forms the upper end of the slot 35 engages the stop member 34.

It will be noted that in the practice of the present invention, full range temperature control is provided for each radiator or like heat-exchanger in the system, independently of all other radiators or heat-exchangers in the system, by reason of the fact that the diameter of the single pipe flow line 12 and of the by-pass lines 13 is the same and the new valve unit provides for a total free area of discharge from the radiator outlet opening (19, 19a or 19b) and from the by-pass outlet opening (20, 20a or 20b.) which is equal to the fluid input into the inlet opening (18, 18a or 18b) into the valve housing (17, 17a or 17b). This is for the reason that the diameter of the outlet openings (19–20–19a–20a–19b–20b) is in all instances equal to the diameter of the inlet line (18 or 18a or 18b) so that regardless of the position of the movable valve member and the outlet ports therein the fluid flow through the single pipe line or system is not impeded by the use of any restricting or restrictive diameter by-pass lines or valves, as in certain of the prior art heating and cooling systems. Moreover, regardless of the number of radiators 14 or like heat-exchangers which are partially or fully by-passed the maximum fluid flow and heating or cooling efficiency of the new single pipe flow system beyond such selected radiator or radiators is preserved and is no way impeded or lowered.

It will be noted that while the present invention has been illustrated in the drawings as applied to a hot water or like fluid heating system it is equally applicable to a fluid cooling or chilling system in which the boiler B would be replaced by a suitable cooling or refrigerating unit and the radiators 14 and 14a would be replaced by suitable heat-absorbing or like heat-exchangers.

It will thus be seen from the foregoing description, considered in conjunction with the accompanying drawings, that the present invention provides a new and improved single pipe heating and cooling system and a new and improved valve unit therefor, and that it has the desirable advantages and characteristics and accomplishes its intended objects including those hereinbefore pointed out and others which are inherent in the invention.

We claim:

In a space conditioning unit having a means for modifying the thermal condition of a circulating fluid and heat transfer means for conditioning the space surrounding the same through heat exchange employing said fluid and a single pipe fluid flow line connecting said means for modifying the thermal condition of said fluid and said heat transfer means, a valve means including a valve housing for operative connection with said two first-mentioned means, said valve housing comprising an inlet opening therein for connection to one side of said single pipe fluid flow line, a bypass outlet opening in said valve housing for operative connection with the other side of said flow line, a second outlet opening in said valve housing in operative connection with said heat transfer means, the interior of said valve housing being cylindrical in cross section, a hollow cylindrical valve element mounted within said housing for rotational movement with respect thereto and having an inlet port at one end and an operating element at the other, said element being axially disposed in position within said housing opposite said outlet openings, that portion of the valve element immediately opposite said bypass outlet opening having a substantially 180° right cylindrical section thereof open to the housing, said valve element opposite said second outlet opening having a 180° right cylindrical section thereof open to the housing, said second section open to said housing being 180° out of phase with said first section open to said housing, said valve element movably mounted in said valve housing means for selectively controlling the flow of fluid from said valve housing through the bypass outlet opening and through said outlet opening to selectively direct all of the fluid in the single pipe fluid flow line through the said heat transfer means when the valve member closes the said bypass opening and to direct all of the fluid through said bypass opening when said valve member closes said second outlet opening and to further direct a part of said fluid in the single pipe fluid flow line through the said heat transfer unit and the balance of said fluid through said bypass opening when said valve member partially closes the bypass opening and the second outlet opening, said valve member and valve housing means being so constructed and arranged that the total area of the outlet openings in all positions of the valve member is equal to the area of the inlet opening.

References Cited by the Examiner

UNITED STATES PATENTS

| | | | |
|---|---|---|---|
| 1,016,382 | 2/12 | Weeden | 137—625.16 |
| 1,106,981 | 10/14 | Speckman | 237—70 X |
| 1,789,390 | 1/31 | Potteiger | 137—625.16 |
| 2,107,933 | 2/38 | Crockett et al. | 237—59 X |
| 2,113,775 | 4/38 | Van Vulpen. | |
| 2,240,731 | 5/41 | Van Vulpen | 257—283 |
| 2,247,972 | 7/41 | Sullivan. | |
| 2,319,347 | 5/43 | Reed | 137—625.22 X |
| 2,547,254 | 4/51 | Braithwaite | 147—625.17 |

FOREIGN PATENTS

| | | |
|---|---|---|
| 303,583 | 7/15 | Germany. |
| 145,374 | 7/20 | Great Britain. |
| 490,631 | 2/54 | Italy. |
| 85,908 | 3/36 | Sweden. |

ROBERT A. O'LEARY, *Primary Examiner*.

HARRY B. THORNTON, CHARLES SUKALO,
*Examiners.*